United States Patent
Pando

(10) Patent No.: US 9,108,779 B1
(45) Date of Patent: Aug. 18, 2015

(54) WIRE TIE DEVICE

(71) Applicant: Jose Pando, Hobbs, NM (US)

(72) Inventor: Jose Pando, Hobbs, NM (US)

( * ) Notice: Subject to any disclaimer, the term of this patent is extended or adjusted under 35 U.S.C. 154(b) by 0 days.

(21) Appl. No.: 14/098,637

(22) Filed: Dec. 6, 2013

(51) Int. Cl.
| | |
|---|---|
| *B65D 63/10* | (2006.01) |
| *F16L 3/08* | (2006.01) |
| *F16L 3/10* | (2006.01) |
| *F16L 3/137* | (2006.01) |

(52) U.S. Cl.
CPC .............. *B65D 63/1063* (2013.01); *F16L 3/10* (2013.01); *F16L 3/137* (2013.01); *Y10T 24/1498* (2015.01); *Y10T 24/3444* (2015.01)

(58) Field of Classification Search
CPC . E05B 75/00; E05B 15/1635; B65D 63/1072; B65D 2563/108; B65D 2563/106; B65D 2563/107; B65D 63/1027; B65D 63/1036; B65D 63/1054; B65D 63/1063; B65D 63/1081; B65D 63/14; B65B 13/027; F16L 3/02
USPC ...... 24/16 PB, 16 R, 17 AP, 30.5 P, 300–302, 24/339
See application file for complete search history.

(56) References Cited

U.S. PATENT DOCUMENTS

| | | | | | |
|---|---|---|---|---|---|
| 3,739,429 | A | * | 6/1973 | Kohke ........................ | 24/16 PB |
| 3,979,799 | A | * | 9/1976 | Merser et al. ................ | 206/346 |
| 4,079,485 | A | * | 3/1978 | Collier et al. ............... | 24/16 PB |
| 4,752,054 | A | * | 6/1988 | Jonsson ......................... | 248/51 |
| 4,898,542 | A | * | 2/1990 | Jones, Jr. ..................... | 439/371 |
| 4,908,911 | A | * | 3/1990 | Bretti et al. ................. | 24/16 PB |
| 4,910,831 | A | * | 3/1990 | Bingold ...................... | 24/16 PB |
| 5,042,181 | A | | 8/1991 | Fortsch | |
| 5,088,158 | A | * | 2/1992 | Burkholder ................. | 24/16 PB |
| 5,398,383 | A | * | 3/1995 | Bingold ...................... | 24/16 PB |
| 5,560,564 | A | * | 10/1996 | Maynard ....................... | 242/402 |
| 5,632,840 | A | * | 5/1997 | Campbell ..................... | 156/196 |
| 5,802,888 | A | * | 9/1998 | Parsons ........................... | 70/16 |
| 5,884,367 | A | * | 3/1999 | Teagno et al. ............... | 24/16 PB |
| 5,967,316 | A | * | 10/1999 | Abbruzzese et al. ......... | 206/343 |
| 6,026,544 | A | * | 2/2000 | Deschenes et al. ......... | 24/16 PB |
| 6,082,577 | A | * | 7/2000 | Coates et al. .................... | 221/80 |
| 6,101,682 | A | * | 8/2000 | Parsons ...................... | 24/16 PB |
| 6,119,314 | A | * | 9/2000 | Freed .......................... | 24/16 PB |
| 6,186,451 | B1 | | 2/2001 | Benoit | |
| 6,196,033 | B1 | * | 3/2001 | Dowdle ........................... | 70/16 |
| 6,219,887 | B1 | * | 4/2001 | Parsons ....................... | 24/16 PB |
| D456,361 | S | * | 4/2002 | Troxell ........................ | D13/154 |
| 6,828,509 | B2 | * | 12/2004 | Ito et al. ........................ | 174/135 |
| 7,062,820 | B1 | * | 6/2006 | Oestreich et al. ........... | 24/16 PB |
| D570,673 | S | * | 6/2008 | Geiger et al. ................. | D8/394 |
| 7,469,854 | B2 | | 12/2008 | Richardson | |
| D599,196 | S | | 9/2009 | Ruffin et al. | |
| 8,269,111 | B2 | | 9/2012 | Scifo et al. | |
| 2002/0104196 | A1 | * | 8/2002 | Geiger ........................ | 24/16 PB |
| 2011/0095089 | A1 | * | 4/2011 | Kolton et al. ................ | 235/492 |
| 2012/0261156 | A1 | | 10/2012 | Dower et al. | |
| 2012/0291231 | A1 | | 11/2012 | Ku | |
| 2013/0126661 | A1 | | 5/2013 | Detweiler | |

* cited by examiner

*Primary Examiner* — Robert J Sandy
*Assistant Examiner* — David Upchurch
(74) *Attorney, Agent, or Firm* — Richard L. Miller

(57) ABSTRACT

A device for securing cables having a first cable tie, a second cable tie and a releasable cable tie, wherein the first cable tie and the second cable tie are for permanently encompassing a single cable, and said releasable cable tie is for releasably encompassing a bundle of cables. The wire ties are connected by a pair of cross bars, and are intended to be affixed to the cable of an electrical appliance or the like for use in organizing the cable of the electrical appliance.

5 Claims, 3 Drawing Sheets

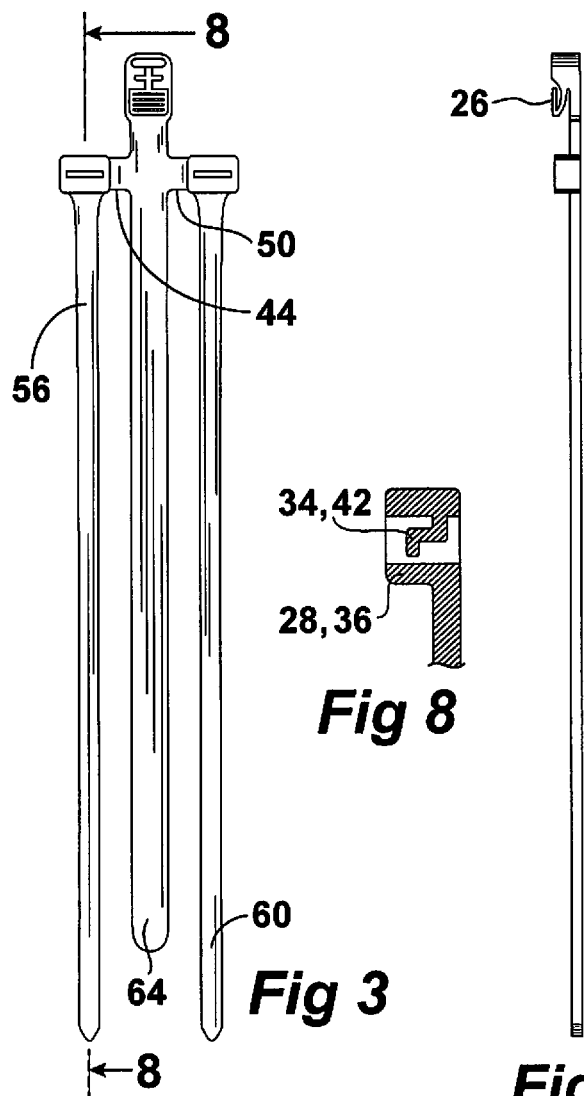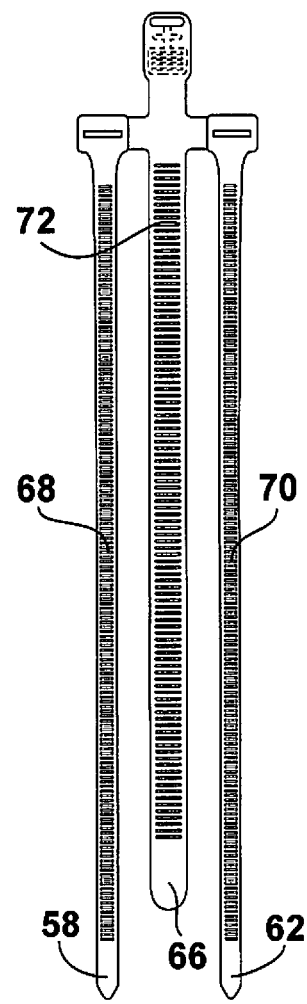

WIRE TIE DEVICE

BACKGROUND OF THE INVENTION

1. Field of the Invention

The present invention relates to a cable organization device, and more particularly, a WIRE TIE DEVICE.

2. Description of the Prior Art

Numerous innovations for cable organizers have been provided in the prior art that will be described. Even though these innovations may be suitable for the specific individual purposes to which they address, however, they differ from the present invention.

A FIRST EXAMPLE, U.S. Pat. No. 5,042,181, Published/Issued on Aug. 27, 1991, to Fortsch teaches an identification tag used in combination with a cable tie is disclosed. The cable tie having a locking head with a channel therethrough and a strap having a tail for passage through the head channel, supports the identification tag. The tag includes a marking surface for supporting identifying indicia and means for securing the tag to the cable tie. An opening in the tag is disposed in alignment with the locking head channel to permit passage of the cable tie tail through the opening as well as through the locking head channel to further secure the tag to the cable tie.

A SECOND EXAMPLE, U.S. Pat. No. 5,560,564, Published/Issued on Oct. 1, 1996, to Maynard teaches a cord organizer for storing an excess length of an electrical power cord including a first and second bundle strap assembly, connected by a central bundle strap connecting member, and a pair of cord clips, located on the bundle strap connecting member. Each bundle strap assembly includes a slotted strap insertable within the strap aperture of a cinch mechanism. The cinch mechanism has a screw-type barrel member that includes a cinch thread formed on an outer surface thereof. The barrel member is rotatable with respect to the strap aperture in a manner such that the cinch thread engages and urges the slotted strap through the strap aperture in a first predetermined direction when the barrel member is rotated in a clockwise direction and a second predetermined direction when the barrel member is rotated in the counter-clockwise direction. When a portion of the slotted strap is secured through the strap aperture, the cinch mechanism and slotted strap formed a closed bundle aperture that is utilized to contain and secure multiple sections of the power cord.

A THIRD EXAMPLE, U.S. Pat. No. 6,186,451, Published/Issued on Feb. 13, 2001, to Benoit teaches a cable tie for securing a connector to a cable of a harness, the connector having a pair of rails which together form a track therebetween. The cable tie comprises an elongated flexible strap having a first end and a second end. A locking head is integrally formed on the first end of the strap and is adapted to cooperate with the strap to form a loop 22 around the cable. The cable tie further comprises a fastener coupled to the strap which is sized and shaped to slide into the track formed in the connector. In one embodiment, the fastener of the cable tie is integrally formed on the strap. In another embodiment, the fastener of the cable tie and the strap are two separate pieces, thereby enabling the fastener to slide along the strap.

A FOURTH EXAMPLE, U.S. Pat. No. 7,469,854, Published/Issued on Dec. 30, 2008, to Richardson teaches a cord organizer is provided. The cord organizer is used for storing, handling and transporting cords or the like, such as electrical extension cords. The cord organizer includes a base for coiling a cord around by forming successive loops of the cord about the base. A flexible strap is provide for securing the coiled cord onto the cord organizer and to secure the individual loops of the coil to prevent the loops from becoming entangled during transportation or storage. In alternate embodiments, the base of the organizer is telescopic to be adjustable in length, cord end clips are provided to restrain free movement of the cord ends, means to positively lock the base is provided and a latch to releasably secure the strap within the slot is provided. An extension cord can also be provided having an integrally molded cord adaptor for attachment to a cord end clip.

A FIFTH EXAMPLE, U.S. Pat. No. 8,269,111, Published/Issued on Sep. 18, 2012, to Scifo, et al. teaches an earpiece/wire organizer houses and maintains wires in an untangled manner. The earpiece/wire organizer has a sleeve constructed with mating spine pieces having an interlocking self-adhering surface coat thereon, wherein the sleeve houses wires therein. Simply scrunching or compressing the sleeve with a single hand motion engages the interlocking self-adhering surface of the mating spine pieces in an attached configuration and compresses the sleeve and wire housed therein. When the user desires to lengthen or elongate the wire, the user simply pulls or elongates the sleeve with a single hand motion that disengages the interlocking self-adhering surface of the mating spine pieces and lengthens the sleeve and wire housed therein. Where more than one sleeve is provided, the sleeves are further constructed to releasably connect to one another.

A SIXTH EXAMPLE, U.S. Pat. No. D599,196, Published/Issued on Sep. 1, 2009, to Ruffin, et al. teaches a cord organizer.

A SEVENTH EXAMPLE, U.S. Patent Office Document No. 20120261156, Published/Issued on Oct. 18, 2012, to Dower, et al. teaches The present invention is directed to a low profile protection device for protecting a cable connection. The protection device includes an elastomeric base layer, a gel sealant material coated on the elastomeric base layer; and a closure mechanism disposed along the protection device such that the protection device exerts a compressive force around the cable connection when disposed in its assembled state. The elastomeric base layer has a first longitudinal edge and a second longitudinal edge, wherein the first and second longitudinal edges are substantially parallel in an assembled state and wherein a portion of the first longitudinal edge is obliquely oriented to a portion of the second longitudinal edge in an unassembled state.

AN EIGHTH EXAMPLE, U.S. Patent Office Document No. 20120291231, Published/Issued on Nov. 22, 2012, to Ku teaches a cable tie is revealed. The cable tie includes a slot base with an insertion hole, a belt and at least one fastener. At least one surface of the insertion hole is a slanted surface. Locking teeth is arranged at a surface of the belt. The fastener is mounted into the insertion hole of the slot base correspondingly. The fastener includes a slanted surface corresponding to the slanted surface of the slot base, and projecting teeth corresponding to the locking teeth of the belt. When the belt is inserted through the insertion hole of the slot base to bind objects tightly, the fastener is mounted into the insertion hole so that the projecting teeth of the fastener are engaged with the locking teeth of the belt so as to lock and fix the belt. The cable tie can be used again once the belt is released from the fastener.

A NINTH EXAMPLE, U.S. Patent Office Document No. 20130126661, Published/Issued on May 23, 2013, to Detweiler teaches an illustrative embodiment of the present invention relates to a cord organizer having a base with first and second posts extending therefrom. First and second flexible nubs couple with the first post and the second post, respectively. The first and second flexible nubs each extend substantially outward from the posts and in a direction opposite and away from the other flexible nub. The result is a cord organizer device formed of two posts around which a cord may be wrapped in a figure-eight pattern. The flexible nubs at the ends of each post help to hold the cord onto the posts by preventing the cord from slipping off the ends of the posts on its own. However, when the cord is to be un-stowed from the cord organizer, the cord can be pulled straight away from the cord organizer, causing the flexible nubs to elastically flex to allow the cord to pass without requiring undue pivoting or rotating of the cord organizer, and further without causing twisting of the cord about its longitudinal central axis. The flexible numbs may be removable and replaceable to enable personalized customization of the cord organizer by a user.

It is apparent now that numerous innovations for cord organizers have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a WIRE TIE DEVICE that avoids the disadvantages of the prior art.

ANOTHER OBJECT of the present invention is to provide a WIRE TIE DEVICE that is simple and inexpensive to manufacture.

STILL ANOTHER OBJECT of the present invention is to provide a WIRE TIE DEVICE that is simple to use.

BRIEFLY STATED, STILL YET ANOTHER OBJECT of the present invention is to provide a WIRE TIE DEVICE that allows permanent attachment to a single strand of a cord, and releasable attachment to a bundle of that same cord.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 3 is a plan view thereof, taken in the direction of arrow 3 in FIG. 2;

FIG. 4 is an end elevational view thereof, taken in the direction of arrow 4 in FIG. 2;

FIG. 5 is an side elevational view thereof, taken in the direction of arrow 5 in FIG. 2;

FIG. 6 is an end elevational view thereof, taken in the direction of arrow 6 in FIG. 2;

FIG. 7 is a plan view thereof, taken in the direction of arrow 7 in FIG. 2; and

FIG. 8 is a partial cross sectional view with parts broken away taken on lines 8-8 in FIG. 3 showing the heads of the cable ties.

A MARSHALING OF REFERENCE NUMERALS UTILIZED IN THE DRAWING

Figure 1:
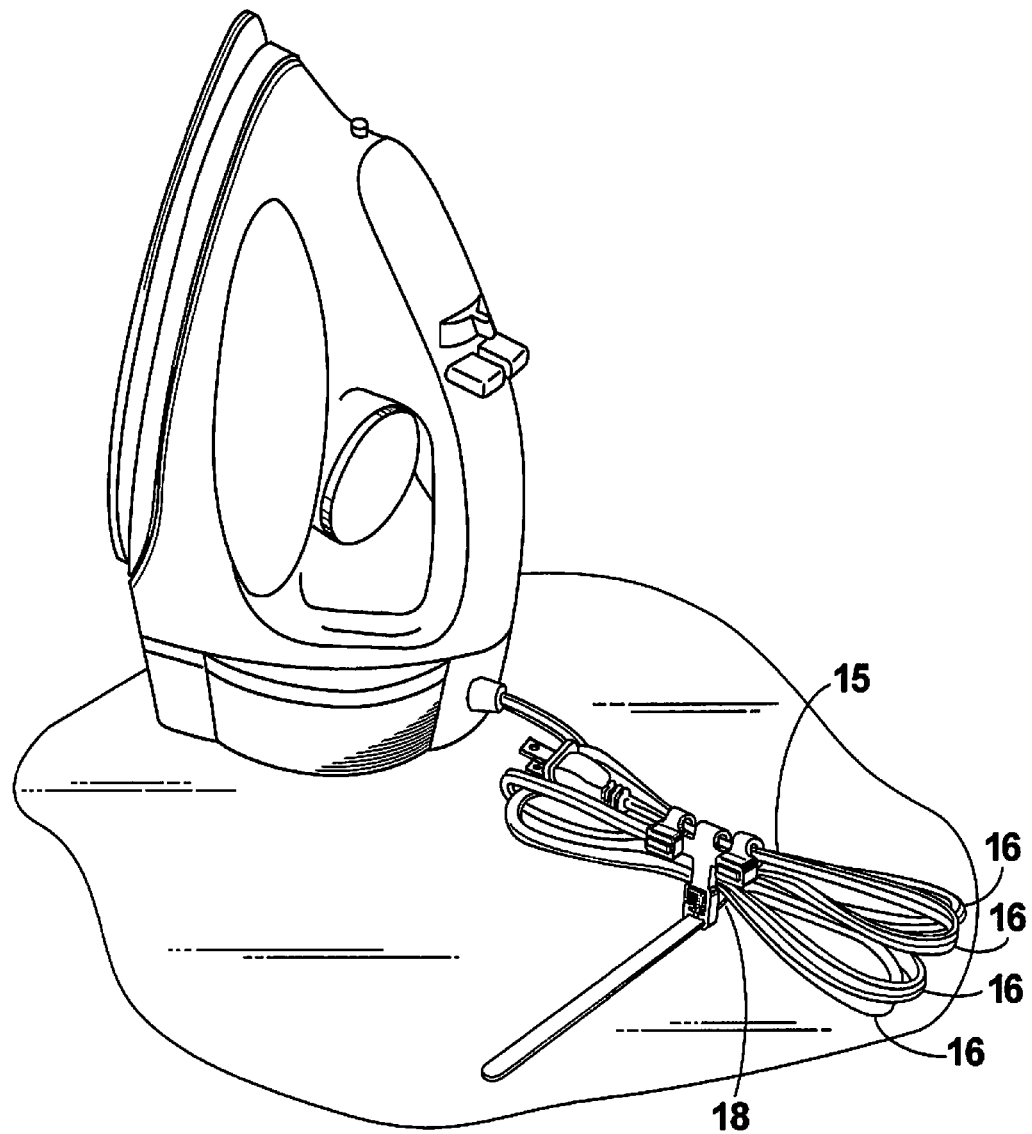
FIG. 1 is a diagrammatic perspective view illustrating an embodiment of the WIRE TIE DEVICE in use.

10 Device for releasably securing cables
11 First cable tie
12 Second cable tie
14 Releasable cable tie
15 Single cable
16 Permanent encompassing of a single cable 15
17 Bundle of cables
18 Releasable encompassing of a bundle of cables 17
20 Head of releasable cable tie 14
22 Tip of releasable cable tie 14
24 Slot of head 20 of releasable cable tie 14
26 Pressable releasing means of head 20 of releasable cable tie 14
28 Head of first cable tie 11
30 Tip of first cable tie 11
32 Slot of head 28 of first cable tie 11
34 One way locking permanent securement means of head 28 of first cable tie 11
36 Head of second cable tie 12
38 Tip of second cable tie 12
40 Slot of head 36 of second cable tie 12
42 One way locking permanent securement means of head 36 of second cable tie 12
44 First cross bar
46 Proximal end of first cross bar 44
48 Distal end of first cross bar 44
50 Second cross bar
52 Proximal end of second cross bar 50
54 Distal end of second cross bar 50
56 Front surface of first cable tie 11
58 Back surface of first cable tie 11
60 Front surface of second cable tie 12
62 Back surface of second cable tie 12
64 Front surface of releasable cable tie 14
66 Back surface of releasable cable tie 14
68 Teeth of back surface 58 of first cable tie 11
70 Teeth of back surface 62 of second cable tie 12
72 Teeth of back surface 66 of releasable cable tie 14

DETAILED DESCRIPTION OF THE PREFERRED EMBODIMENT

Figure 2:
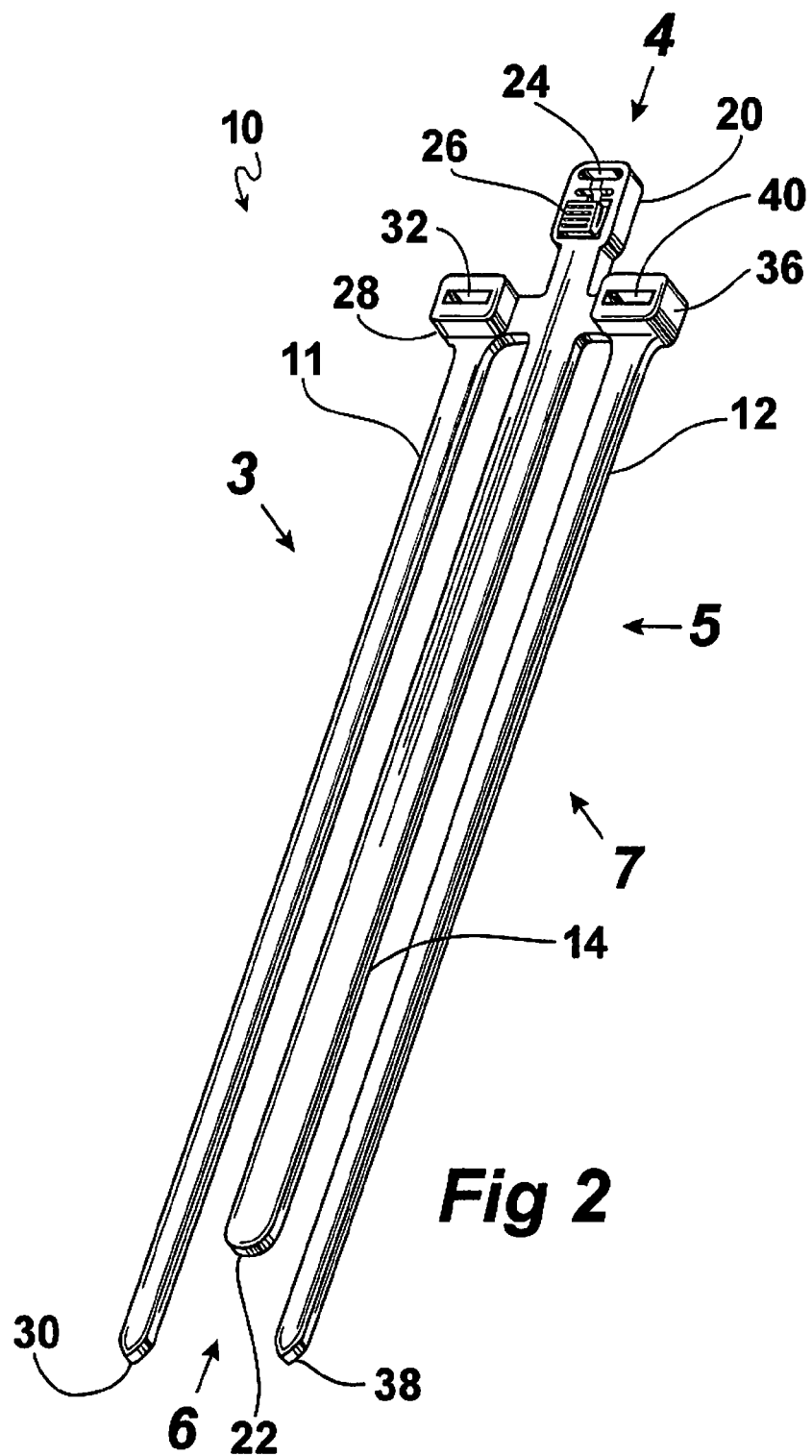
FIG. 2 is a diagrammatic perspective view of the WIRE TIE DEVICE per se.

Referring now to the figures, in which like numerals indicate like parts, and particularly to FIGS. 1 and 2. These figures show the invention in use and per se. Disclosed is a wire tie device 10 for releasably securing cables for electronic devices and the like. The device 10 comprises a first cable tie 11, a second cable tie 12, and a releasable cable tie 14.

The first cable tie and the second cable tie are both for permanently encompassing 16 a cable 15. The releasable cable tie 14 is for releasably encompassing 18 a bundle of cables 17. The bundle of cables 17 is preferably composed of the single cable 15 being wound or otherwise formed into a bundle, but the device may encompass any bundle of cables or cable like objects such as straws or sticks, whether or not they are connected.

The releasable cable tie 14 comprises a head 20 and a tip 22. The head 20 of the releasable cable tie 14 comprises a slot 24 and a pressable releasing means 26. The first cable tie 11 comprises a head 28 and a tip 30. The head 28 of the first cable tie 11 comprises a slot 32, which slot 32 integrates therein a one way locking permanent securement means 34. The second cable tie 12 comprises a head 36 and a tip 38. The head 36 of the second cable tie 12 comprises a slot 40. The slot 40 comprises a one way locking permanent securement means 34.

The tip 30 of the first cable tie 11 is for inserting into the slot 32 of the head 28 of the first cable tie 11 for permanently encompassing 16 a cable 15. The tip 38 of the second cable tie 12 is for inserting into the slot 40 of the head 36 of the second cable tie 12 for permanently encompassing 16 a cable 15. The tip 22 of the releasable cable tie 14 is for inserting into the slot 24 of the head 20 of the releasable cable tie 14 for removably encompassing 18 a bundle of cables 17.

The device 10 further comprises a first cross bar 44. The first cross bar has a proximal end 46 and a distal end 48. The proximal end 46 of the first cross bar 44 is attached to the head 28 of the first cable tie 11. The distal end 48 of the first cross bar 44 is attached to the head 20 of the releasable cable tie 14.

The device still further comprises a second cross bar 50. The second cross bar also has a proximal end 52 and a distal end 54. The proximal end 52 of the second cross bar 50 is attached to the head 20 of the releasable cable tie 14. The distal end 54 of the second cross bar 50 is attached to the head 36 of the second cable tie 12.

In this way then, the cross bars connect the heads 28,36 of the two cable ties for permanently encompassing 16 a single cable 15 to the head 20 of the releasable cable tie 14. This connection is preferably attained through an integral construction, which provides a strong connection of the cross bars to the heads. The attachment to the heads is necessary because the cable ties need to be able to slide through the heads to operate properly, and therefore attachment anywhere else would lead to an inoperative or less effectively operative device.

Referring now to FIGS. 3-7, these Figures show the present invention from all sides, as shown in the reference directional arrows in FIG. 2. From these views, it is apparent that the first cable tie 11 has a front surface 56 and a back surface 58, the second cable tie 12 has a front surface 60 and a back surface 62, and the releasable cable tie 14 has a front surface 64 and a back surface 66. Further, the back surface 58 of the first cable tie 11 has a plurality of teeth 68 thereon, the back surface 62 of the second cable tie has a plurality of teeth 70 thereon, and the back surface 66 of the releasable cable tie has a plurality of teeth thereon 72.

As can be most clearly seen in FIGS. 1, 2, and 8 viewed together, the plurality of teeth 72 of the releasable cable tie 14 cooperate with the pressable releasing means 26 of the releasble cable tie 14. The plurality of teeth 68 of the first cable tie 11 cooperate with the permanent securement means 34 of the head of 28 the first cable tie 11. The plurality of teeth of the second cable tie cooperate with the permanent securement means 42 of the head 36 of the second cable tie 12.

It will be understood that each of the elements described above, or two or more together, may also find a useful application in other types of constructions differing from the types described above.

While the invention has been illustrated and described as embodiments of a WIRE TIE DEVICE, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A wire tie device for releasably securing cables for electronic devices, comprising:
   a) a first cable tie;
   b) a second cable tie;
   c) a releasable cable tie;
      wherein said first cable tie is for permanently encompassing a cable; wherein said second cable tie is for permanently encompassing a cable;
      wherein said releasable cable tie is for releasably encompassing a bundle of cables; wherein said releasable cable tie comprises:
      a) a head; and
      b) a tip; and wherein said head of said releasable cable tie comprises:
      a) a slot; and b) a releasing means; wherein said first cable tie comprises:
      a) a head; and b) a tip; and wherein said head of said first cable tie comprises a slot; and wherein said slot comprises a permanent securement means;
      wherein said second cable tie comprises:
      a) a head; and
      b) a tip; and wherein said head of said second cable tie comprises a slot;
      wherein said slot comprises a permanent securement means;
      wherein said tip of said first cable tie is for inserting into said slot of said head of said first cable tie for permanently encompassing a cable;
      wherein said tip of said second cable tie is for inserting into said slot of said head of said second cable tie for permanently encompassing a cable; and
      wherein said tip of said releasable cable tie is for inserting into said slot of said head of said releasable cable tie for removably encompassing a bundle of cables;
   wherein said device further comprises a first cross bar;
   wherein said first cross bar has a proximal end and a distal end;
      wherein said proximal end of said first cross bar is attached to said head of said first cable tie; and
      wherein said distal end of said first cross bar is attached to said head of said releasable cable tie;
      wherein said device further comprises a second cross bar;
      wherein said second cross bar has a proximal end and a distal end;
      wherein said proximal end of said second cross bar is attached to said head of said releasable cable tie; and
      wherein said distal end of said second cross bar is attached to said head of said second cable tie;
      wherein said first cable tie has a front surface and a back surface;
      wherein said second cable tie has a front surface and a back surface;
      wherein said releasable cable tie has a front surface and a back surface;
      wherein said back surface of said first cable tie has a plurality of teeth thereon;
   wherein said back surface of said second cable tie has a plurality of teeth thereon; and
      wherein said back surface of said releasable cable tie has a plurality of teeth thereon.

2. The device of claim 1 wherein said plurality of teeth of said releasable cable tie cooperate with said releasing means of said releasble cable tie.

3. The device of claim 2 wherein said releasing means of said releasble cable tie comprises a pressable releasing means.

4. The device of claim 1 wherein said plurality of teeth of said first cable tie cooperate with said permanent securement means of said head of said first cable tie; and wherein said plurality of teeth of said second cable tie cooperate with said permanent securement means of said head of said second cable tie.

5. The device of claim 4 wherein said permanent securement means of said first cable tie and said permanent securement means of said second cable tie each comprise a one way locking permanent securement means.

\* \* \* \* \*